US005989116A

United States Patent [19]

Johnson et al.

[11] Patent Number: 5,989,116

[45] Date of Patent: Nov. 23, 1999

[54] HIGH-SPEED BONE-IN LOIN SLICER

[75] Inventors: Bruce A. Johnson, Ft. Collins, Colo.; John Cliff, Louisville, Ky.

[73] Assignee: Swift & Company, Inc., Greeley, Colo.

[21] Appl. No.: 09/018,509

[22] Filed: Feb. 3, 1998

[51] Int. Cl.[6] .................... A22C 17/02

[52] U.S. Cl. .................... 452/150; 452/163; 83/153; 83/206; 83/222

[58] Field of Search .................... 452/149, 150, 452/155, 163; 83/153, 206, 222, 282, 396, 42

[56] References Cited

U.S. PATENT DOCUMENTS

| | | | |
|---|---|---|---|
| 4,181,053 | 1/1980 | Duddridge | 83/80 |
| 4,273,013 | 6/1981 | Artin et al. | 83/167 |
| 4,312,252 | 1/1982 | Duddridge | 83/155 |
| 5,862,730 | 1/1999 | Cartwright et al. | 83/42 |

*Primary Examiner*—Willis Little
*Attorney, Agent, or Firm*—Sheridan Ross P.C.

[57] ABSTRACT

A meat slicing apparatus is disclosed, wherein the apparatus is capable of high-speed slicing of meat having large skeletal bones therein. The apparatus has a blade composed of a steel alloy that is approximately 5 to 10 times greater in compression strength than typical steel. The blade has an involute shape for withstanding the stresses incurred when slicing through bones having compression near that of steel, e.g., pork loin bones. The meat slicer includes a mechanism for securing a position of a meat section to be sliced so that the meat section stays in place during a slicing process, thereby reducing the risk of misalignment of the meat section with the blade. Thus, without such misalignments, there is a reduction in blade failures, shattered bones, bone fragments, and bone dust. Also, the securing mechanism reciprocates between securing the meat section for slicing and releasing it sufficiently for indexing toward the blade between slicing operations.

29 Claims, 10 Drawing Sheets

502
603
604

608
607
506
606
605
502
610

601

602
502

606

605

HIGH-SPEED BONE-IN LOIN SLICER

FIELD OF THE INVENTION

The present invention relates to a high-speed meat slicer and, in particular, a meat slicer for meat sections having large skeletal bones therein, such as pork loins.

BACKGROUND OF THE INVENTION

In certain meat processing operations, it is necessary to slice through both bone and meat. For large meat-bearing animals such as cattle and hogs, cost effectively and efficiently slicing through carcass sections having large skeletal bones has been difficult in that one or more of the following problems can frequently occur:

(a) since the compression strength of many such skeletal bones is approximately equal to that of steel, typical steel blades can fail or fracture at an unacceptable rate;

(b) there may be yield loss because the thicknesses of slices can deviate unacceptably from a desired thickness due to, for example, the variations in slicing resistance between soft tissue, cartilage, dense bone, and/or vibrations within the slicing machine such as in a slicing blade. Note that such deviations can be deviations in the thicknesses between slices and/or deviations in the thickness of a single slice;

(c) if the slicing blade is not appropriately aligned or has insufficient cutting characteristics (e.g. blade velocity, sharpness and thinness), then such large bones may shatter thereby producing slices of meat undesirable for premium commercial sales; and (d) an excessive amount of bone dust may be scattered across a face of sliced meat when the cutting edge is not sufficiently hardened so that it remains sharp through large numbers of cutting cycles. Moreover, if the blade has a cutting edge with teeth (such as a band saw) such teeth are typically designed for tearing or sawing off slices of meat, thus also producing bone dust.

Thus, it would be advantageous to have a bone-in meat slicing apparatus that can reliably perform high speed meat slicing operations, and cleanly slice such large skeletal bones. In particular, it would be desirable to have a meat slicer that can slice at high speeds bone-in pork loins, wherein the bones are cleanly cut, the slices have a consistent thickness, and wherein there is a substantial reduction of bone dust scattered across the cut face of the meat slices. Moreover, it would be advantageous to provide such slicing apparatus, wherein it is unnecessary to induce rigidity into the meat being sliced by freezing some portion thereof, such as the outer soft tissue layers as is required by some prior art bone-in meat slicers.

SUMMARY OF THE INVENTION

The present invention is a high-speed meat slicer for slicing meat sections having large skeletal bones therein. In particular, the meat slicer of the present invention provides a novel high-speed rotating blade that has a compressive strength of approximately 5 to 10 times that of ordinary steel. Further, the present invention provides novel techniques for securing bone-in meat sections to be sliced so that there is no movement of the meat section that would cause either the blade or the meat to misalign and produce a poor cut and/or blade failure when slicing the meat section.

The blade of the present invention is made of a tungsten/steel alloy of approximately: 2.5% tungsten, 1% chromium, 0.1% carbon, 0.15% silica, and the remainder being a high-speed steel mixture. Or in another embodiment, the blade is made of a high-speed stainless steel such as is used for cutting food products, wherein this steel is additionally hardened through a zirconium vapor deposition process. That is, it is an aspect of the present invention that a blade of one of the above compositions can be provided that has a compressive strength in a range of 600,000 to 900,000 pounds per square inch with a rupture strength in a range of 100,000 to 130,000 pounds per square inch. Thus, the blade of the present invention has a compressive strength of approximately 5 to 10 times that of bones such as found in pork loins. Moreover, the novel blade of the present invention has a novel configuration in that the blade has a spiral or seashell profile with a meat slicing edge substantially extending radially from a center of mass of the blade. Thus, the blade has significant strength in the plane of rotation wherein meat slicing is performed.

It is a further aspect of the present invention that the mechanism for securing the meat sections in position for slicing includes a slot or chamber in which the meat sections are deposited and subsequently secured on substantially all sides so that the meat sections cannot become misaligned during the slicing process. In particular, the securing mechanism includes a cover for enclosing the meat receiving slot, wherein the cover is held in place by one of: a pneumatic device, a hydraulic device, an electrical device, as one skilled in the at will understand. Further, there is also included a mechanism for fixing the position of a meat section being sliced, wherein the mechanism iteratively fixes the meat section during a slicing operation and releases the meat section for subsequent incremental movement toward the blade between slicing operations.

It is a further aspect of the present invention that a meat slicing controller coordinates: (a) an indexing of the meat slices toward the blade with, (b) the rotational position of the slicing edge of the blade so that the meat slices are moved toward the blade only between slicing operations.

It is yet another aspect of the present invention that this meat slicer is capable of high speed slicing of bone-in pork loins.

Other features and benefits of the present invention will become apparent from the detailed description and the accompanying drawings herein.

BRIEF DESCRIPTION OF THE DRAWINGS

FIGS. 6–11 show drawings for an alternative embodiment of the present invention. In particular, these figures can be described as follows.

FIG. 6 illustrates an overall plan view of the alternative loin slicing system of the present invention. This figure shows a loin push bar 501, a loin holding mechanism 502, a loin in-feed conveyor 503, a control panel 504, a loin chop discharge conveyor 505, a slicer blade/guard 506, loin holding mechanism 502, having: tensioning sprockets 1000 for maintaining tension on the loin contacting belts 1001.

DETAILED DESCRIPTION

Figure 1:
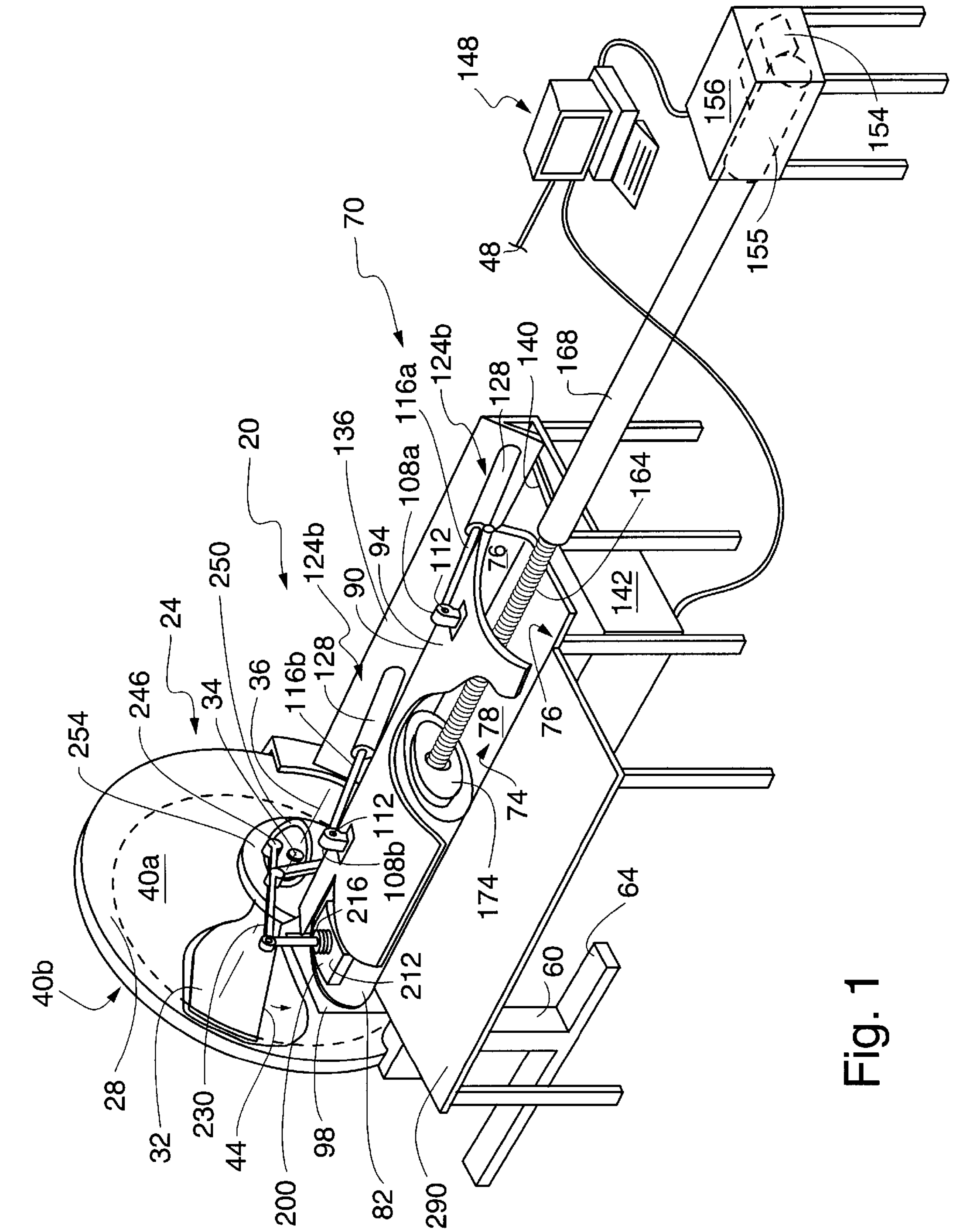
FIG. 1 is a perspective view of the loin slicer 20 of the present invention, illustrating this loin slicer in operation.
Figure 2:
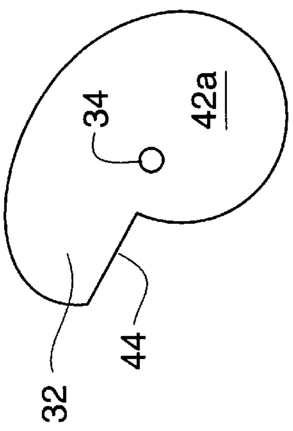
FIG. 2 is a side view of the novel blade 32 used for slicing meat in the present invention.
Figure 3B:
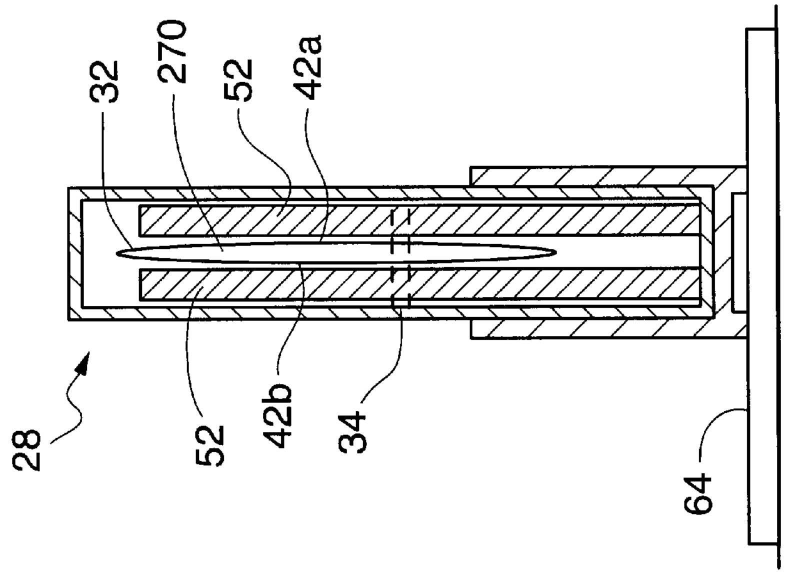
FIG. 3B shows a cross sectional view of the blade housing 28 as viewed from cross section 3B labeled in FIG. 3A.

FIG. 1 shows a perspective view of the novel loin slicer of the present invention, wherein some portions of the loin slicer 20 have been cut away to better illustrate certain internal structures. The loin slicer 20 includes a slicing assembly 24 that includes a disk-like blade housing 28 having a diameter of approximately 5 feet (but may vary from 2 feet to 6 feet). The blade housing 28 includes within its interior a blade 32 that rotates on a shaft 34, wherein the shaft is coincident with the axis 36 that is normal, or substantially so, to the large disk-like vertical housing surfaces such as the surfaces 40*a* and 40*b*. Note that the blade is also shown in FIG. 2, wherein it is evident that the blade has a shell-like or involute profile with opposed surfaces 42*a* and 42*b* (FIGS. 2, 3A and 3B), and a cutting edge 44 for slicing through pork loins with bones therein. Note that, as indicated in FIG. 3B, the blade 32 varies in thickness and density, as will be described in further detail hereinbelow. Further note that the blade 32 has a center of mass that is offset from both the axis of rotation and the moment of inertia about the shaft 34 as will be described in detail hereinbelow. Thus, the blade 32 functions much like an ax or cleaver head swinging from a relatively lightweight shaft, thereby allowing the slicing force induced by the offset center of mass to enhance the slicing force applied to a bone-in loin during acceleration toward the loin. The blade and the shaft are rotated by a direct drive servo motor 48 (FIG. 3A) that is on the opposite side of the housing 28 from that shown in FIG. 1. Additionally, note that internally to the blade housing 28 and on each side of the blade 32 are two blade alignment shim disks 52 (FIGS. 3A and 3B) that in at least one embodiment includes a self-lubricating plastic, such as an ultra high molecular weight (UHMW) or a Delron plastic, for tightly confining the blade 32 to its intended rotational path. That is, the shim disks 52 are provided on each side of the blade 32 so that when the blade is rotated at high speed (e.g. 150–250 rpm) the shim disks reduce blade vibrations that might cause the blade to shatter upon contact with high density bones within a pork loin and/or provide a poor cut through the pork loin by, for example, shattering the bone within a pork loin or creating a substantial amount of bone fragments that are distributed across the cut face of a pork loin slice.

The slicing assembly 24 also includes a support 54 (FIG. 3A) that has an annular blade housing cradle 56 and at least two legs 60 with extended feet 64 for firmly securing the slicing assembly 24 to the floor in a manner that tends to reduce vibrations caused by rotation of the blade 32.

Returning to FIG. 1, in the foreground from the blade slicing assembly 24, the loin slicer 20 further includes a pork loin indexing and hold-down subassembly 70 that accurately controls the feeding of a bone-in pork loin (e.g., pork loin 82) to the rotating blade 32 for slicing. The indexing and hold-down subassembly 70 includes a pork loin processing slot 74 that extends perpendicular to the face of the blade 32. The processing slot 74 is designed to receive pork loins 82, wherein the pork loins are incrementally moved toward the blade 32 so that repeated portions can be sliced from the pork loin with an accuracy of ⅛" variation or less. The embodiment of the processing slot 74 of FIG. 1 has slanted sidewalls 76 that tend to follow the contours of a typical pork loin provided in the processing slot 74. In one embodiment, the sidewalls 76 are angled at a 30° angle from the horizontal. Additionally, note that the bottom surface 78 upon which the majority of the pork loin 82 being processed rests, may have various contours different from the substantially flat bottom surface shown in FIG. 1. In particular, the bottom surface 78 may be convex to thereby more easily conform to the rib curvature of the pork loins 82 being processed.

At the upper end of one of the sidewalls 76 is a hinge 90 that hinges a loin hold-down cover 94 to the processing slot 74. Note that the loin hold-down cover 94 is cut away in order to show the interior of the processing slot during the processing of the pork loin 82. That is, the loin hold-down cover 94 extends substantially over the entire processing slot 74 with the exception of a cut-out portion adjacent to the blade housing 28. That is, the cut out portion is adjacent a cutting window 98 that allows the rotating blade 32 to come in contact with a predetermined thickness of the loin 82 that is pushed through the cutting window.

Attached to the exterior surface of the loin hold-down cover 94 are two pivot attachments 108*a* and 108*b*. These pivot attachments have a pivot pin 112 for pivotally connecting the pivot attachments 108 to corresponding shafts 116*a* and 116*b*, respectively, wherein each shaft is part of a corresponding pneumatically, hydraulically or electrically activated cylinder assembly 124*a* and 124*b* for controlling the extension of the shafts 116 extending out from the pneumatic cylinders 128*a* and 128*b* that are also included in corresponding pneumatic cylinder assemblies 124*a* and 124*b*, respectively. Thus, as the shafts 116 extend from the pneumatic cylinders 128, the loin hold-down cover 94 rotates about its hinge 90 to close over the processing slot 74 and any loin 82 therein for thereby securing the loin 82 on substantially all sides during processing. Conversely, when the shafts 116 recede into the pneumatic cylinders 128, the loin hold-down cover 94 rotates about hinge 90 to expose the processing slot 74.

The pneumatic cylinder assemblies 124 are secured to a slanted housing 136. Pneumatic hoses or lines 140 connect each of the pneumatic cylinder assemblies 124 with a port (not shown) for a pneumatic controller 142 located below the processing slot 74. Accordingly, the pneumatic controller governs the air pressure provided to the pneumatic cylinder assemblies 124 for opening the loin hold-down cover 94 from the processing slot 74 and closing the loin hold-down cover 94 over the processing slot 74 to, for example, hold the loin 82 in a predetermined orientation and position for slicing with the blade 32.

The pneumatic controller 142 is signally connected to a loin slicer controller 148 that controls and monitors the processing of loins 82 by the loin slicer 20. Accordingly, the loin slicer controller 148 is also signally connected to the motor 48 for monitoring and governing the speed of this motor. More precisely, the loin slicer controller 148 is signally connected to a motor actuator provided within the housing for the motor 48 for monitoring and governing the rotation rate of the shaft 34.

The loin slicer controller 148 is also signally connected to a motor controller 154 within the housing 156 for thereby controlling a motor 155 also within the housing 156, the motor being used for rotationally extending the threaded shaft 164 from the shaft housing 168. In particular, the motor 155 and motor controller 154 residing within the housing 156 are used to iteratively rotate the threaded shaft 164 a predetermined number of turns to thereby urge a predetermined thickness of the loin 82 through the cutting window 98 according to signals provided by the loin slicer controller 148. However, in an alternative embodiment, instead of having the threaded housing 168 and the threaded shaft 164 extending substantially beyond the processing slot 74 (as shown in FIG. 1), alternative mechanisms for indexing the loin 82 toward the blade 32 that are more compact may be provided. In particular, the loin indexing plate 174 can be urged toward the blade by a linear motor that can be, for example, housed immediately underneath the bottom surface 78 wherein this bottom surface would then contain a channel (not shown) extending the length of the bottom surface and perpendicular to the blade 32. Moreover, a slidable pushing plate (also not shown) can be provided that is slidable within the channel and operatively connected to the linear motor so that this motor can urge the slidable pushing plate toward the blade 32. Thus, by attaching the loin indexing plate 174 to the slidable plate, the loin indexing plate can be appropriately indexed for urging the loin 82 toward the blade 32. Additionally, note that in another embodiment a servo stepper motor in combination with a worm gear may be used to urge the loin indexing plate 174 and the loin 82 toward the blade 32 as one skilled in the art will understand.

Figure 4:
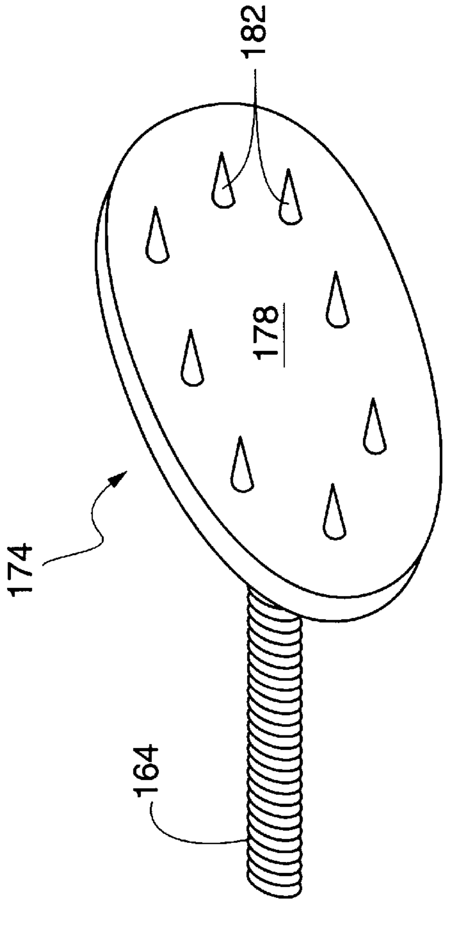
FIG. 4 shows a perspective view of the loin indexing plate 174.

The loin 82 is held in place not only by the processing slot and the loin hold-down cover 94, but also by a loin indexing plate 174 that is attached to the threaded shaft 164 in a manner that allows the shaft 164 to rotate without rotating the loin indexing plate 174. Accordingly, the loin indexing plate 174 firmly secures the end of the loin furthest from the blade 32 from unintended movement as well as uniformly urging the loin 82 toward the blade 32 according to the actuation of the motor 155 within the housing 156. Note that the loin indexing plate 174 is shown from a different perspective in FIG. 4, wherein the face 178 of the loin indexing plate that contacts the end surface of the loin 182 is shown. Note that the face 178 has a plurality of meat-piercing projections 182 that secure the loin indexing plate 174 to the end of the loin 82. Note that in one embodiment of the loin indexing plate 174, each of the projections 182 may have an expandable component that expands once the projection has entered into the end of the loin 82. For example, such an expandable component can be pneumatically, hydraulically, or electrically driven. The projections 182 may have barbed components that are biased for expansion and can be activated for retracting. Thus, the end portion of the loin 82 through which the projections 182 extend can be easily removed by activating the barbed components to retract.

The loin 82 is also secured adjacent the cutting window by a loin press 200 that fits within the cut-out portion of the loin hold-down cover 94. The present embodiment of the loin press 200 is also shown from a different perspective in FIG. 5. Accordingly, it should be noted that the bottom face 204 of the loin press can be concave for thereby matching a typical contour of the top of the loin 82 to which this face comes in contact. Further note that the bottom face 204 includes a plurality of projections 208 for securing the loin press to the top of the loin during a cutting operation for thereby inhibiting any undesired movement of the loin 82 when a portion thereof is being sliced off.

Figure 5:
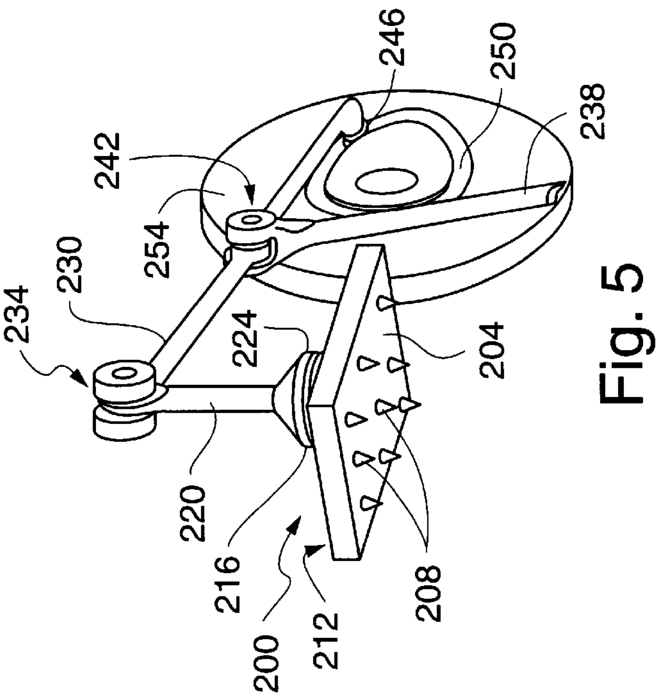
FIG. 5 provides a more detailed view of the loin press 200 and the camming mechanism for iteratively holding and releasing a loin during slicing.

Connected to the top surface 212 of the loin press 200 is a compressible housing 216 that is in turn connected to a vertical shaft 220 (best shown in FIG. 5). Note that the compressible housing 216 may include an enclosed compression spring 224 therein so that a downward force applied to the vertical shaft 220 can be variably applied, via the spring, through the loin press 200 to the loin 82. Thus, the loin press 200 can accommodate and firmly hold loins of varying size and thickness due to the compressibility of the compressible housing 216 and the compression spring 224 included therein.

The end of the vertical shaft 220 opposite the connection to the compressible housing 216 is pivotally attached to pivot arm 230 via pivot assembly 234. The pivot arm 230 is additionally attached in a middle area to a stationary shaft 238 at a pivot point 242 that allows the portions of the pivot arm 230 on each side of the stationary shaft 238 to rock or pivot in a reciprocating see-saw fashion. Accordingly, when the portion of the pivot arm 230 furthest from the shaft 220 is urged upward, then the loin press 200 is urged downward toward the loin 82. Conversely, when the portion of the pivot arm furthest from the shaft 220 is urged downward, then the loin press 200 is urged upward away from the loin 82. Note that the end of the pivot arm 230 furthest from the pivot 234 has a cam follower 246 attached thereto for following the cam path 250 that is recessed within the cam disk 254. Thus, since the cam disk 254 rotates synchronously on the shaft 34 with the blade 32, the cam follower 246 traverses the oblong cam path 250 with each rotation of the blade 32. Thus when the cam follower 246 reaches a point in the cam path 250 that is near the edge of the cam disk 254, then the portion of the pivot arm 230 on the cam follower side of the stationary shaft 238 is raised and correspondingly the loin press 200 is lowered for contacting the loin 82. Conversely, as the cam follower 246 reaches a portion of the cam path 250 close to the shaft 34, the loin press 200 is raised allowing the loin 82 to be moved forward by the loin indexing plate 74. Thus, by appropriately synchronizing the orientation of the cam path 250 to the blade 32 rotation, the loin press 200 can be synchronized with the blade for holding or pressing downward on the loin 82 just before and during the slicing of the loin by the blade 32 and then subsequently releasing the loin 82 so that the loin can be moved further towards the blade 32 for the next slicing operation.

The loin slicer 20 also includes a loin feed table 290 for loading pork loins thereon in preparation for subsequently providing these loins to the processing slot 74. Thus, in operation, a user provides a loin 82 on the loin feed table 290 in an orientation substantially identical to the orientation of the loin 82 within the processing slot 74. Accordingly, after providing loins 82 on the loin feed table 290 in this orientation, a user may then provide input to a control console such as that of the loin slicer controller 148, for activating the pneumatic controller 142 for opening the hold-down cover 94. Alternatively, a control console fixedly attached to the loin slicer 20 and having user activatable mechanisms (e.g. buttons, switches, etc.) specifically designed for the operations of the loin slicer 20 may be used for entering user commands, wherein the user commands can (de)activate various components of the loin slicer 20 such as: opening/closing the hold-down cover 94, activating/deactivating blade 32 rotation, and emergency stop for immediately ceasing both blade rotation and activation of motor 155. Accordingly, once the user has the loin hold-down cover 94 in an open position, the user can provide one or more loins 82 in the processing slot 74. Subsequently, the user then supplies activation loin slicer control commands (via the loin slicer controller 148 or some alternative control console) for causing the pneumatic controller 142 to activate the pneumatic cylinder assemblies 124 so that the shafts 116 extend and thereby cause the loin hold-down cover 94 to close over the newly provided one or more loins within the processing slot 74. Subsequently, the user may then enter loin slicer commands for activating the motor 48 so that the blade 32 and the cam disk 254 commence rotation. Once the loin slicer controller 148 has detected that the blade has reached a predetermined rotation rate about the shaft 34, and additionally has received consistent feedback as to when the blade 32 is in a position to slice a pork loin 82, the loin slicer controller 148 outputs information to the user indicating that loin slicing can commence. Accordingly, assuming that the user requests commencement of slicing, the loin slicer controller 148 synchronizes the activation of the motor 155 within the housing 156 for indexing the one or more loins 82 toward the cutting window 98 with the position of the blade cutting edge 44 so that the threaded shaft 164 rotatably extends from the shaft housing 168 only during that portion of the rotation of the blade 32 wherein the blade is entirely clear of the cutting window 98. Thus, once the loin 82 is indexed forward into the cutting window 98, the blade 32 and the cam disk 254 rotate such that just before the blade contacts the loin 82, the loin press 200 is forced downward to contact the loin 82 and thereby firmly hold the loin in place while the blade 32 slices a predetermined amount of the loin. Subsequently, once the blade has sufficiently cleared the cutting window 98, the loin slicer controller 148 activates the motor 155 within the housing 156 to again urge the loin 82 into the cutting window 98 in preparation for severing a next predetermined thickness of the loin from the loin 82. Note that it is an aspect of the present invention that the blade 32 can slice the loin 82 approximately every 0.75 seconds and that these slices are substantially free of bone dust and bone fragments due to, for example, the tightly controlled positioning and orientation of both the blade 32 and the loin 82. That is, the shim disks 52 assist in maintaining the blade 32 in an orientation that causes the cutting edge 44 of the blade 32 to enter the loin substantially perpendicular to the large primary bone residing therein. Further, the loin hold-down cover 94 and the loin press 200 facilitate in securing the loin 82 so that there is effectively no movement of the loin when the blade 32 is slicing therethrough. More particularly, the loin 82 is held securely in place within the processing slot 74 on all sides so that there is virtually no movement of the loin 82 during slicing even though the bone may have a compressive strength up to 105,000 pounds per square inch (more precisely, between 60,000 pounds per square inch and 105,000 per square inch), this being on the order of the same compressive strength of steel at an average of 120,000 pounds per square inch.

Further note that in one embodiment, the loin slicer blade 32 has the following features:

(1) The moment of inertia (Io) of the blade 32 is offset from the center of mass of the blade so that the blade is able to gather gravitational momentum for slicing, as will be discussed in further detail hereinbelow.

(2) The blade surfaces 42*a* and 42*b* are sufficiently large to effectively dampen the vibration inherent from both rotating the blade 32 and contacting the loin 82.

Figure 3A:
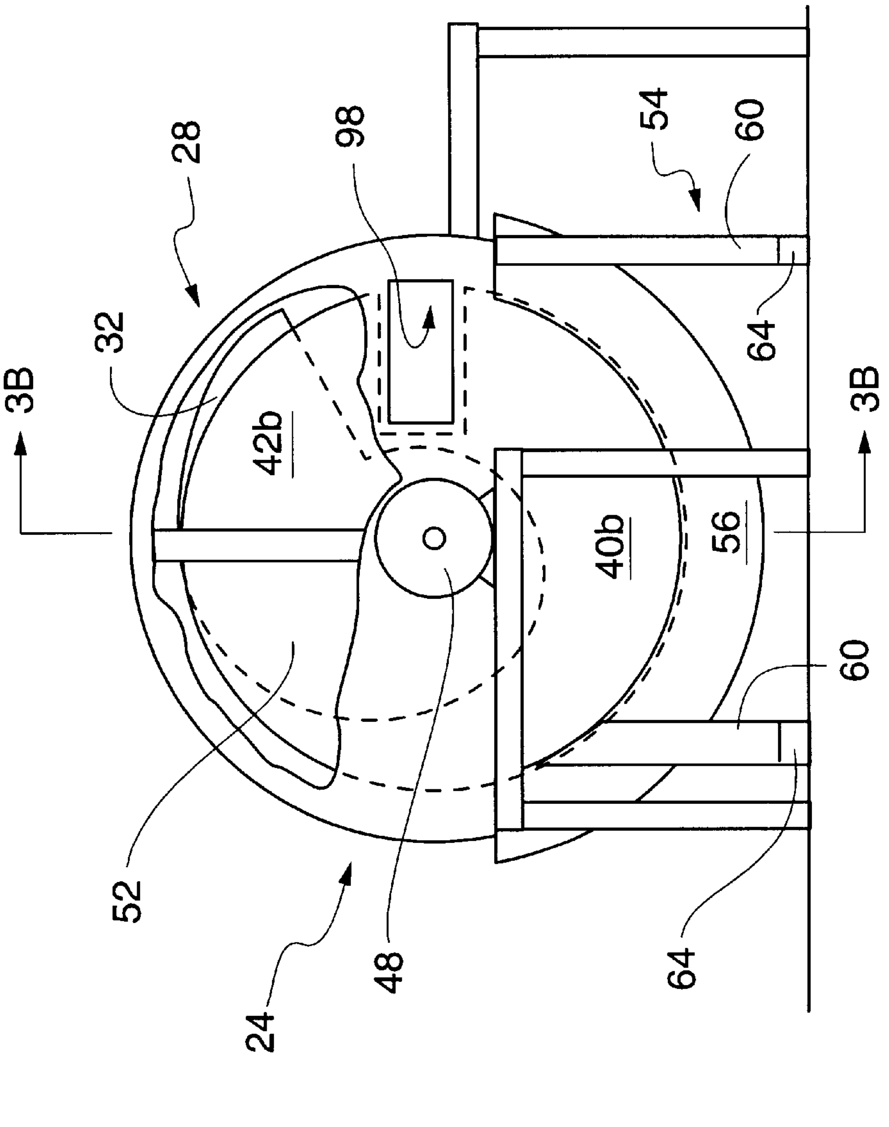
FIG. 3A shows another view of the loin slicer 20 of the present invention, wherein this view shows the side of the blade housing 28 that is hidden in FIG. 1.
Figure 6:
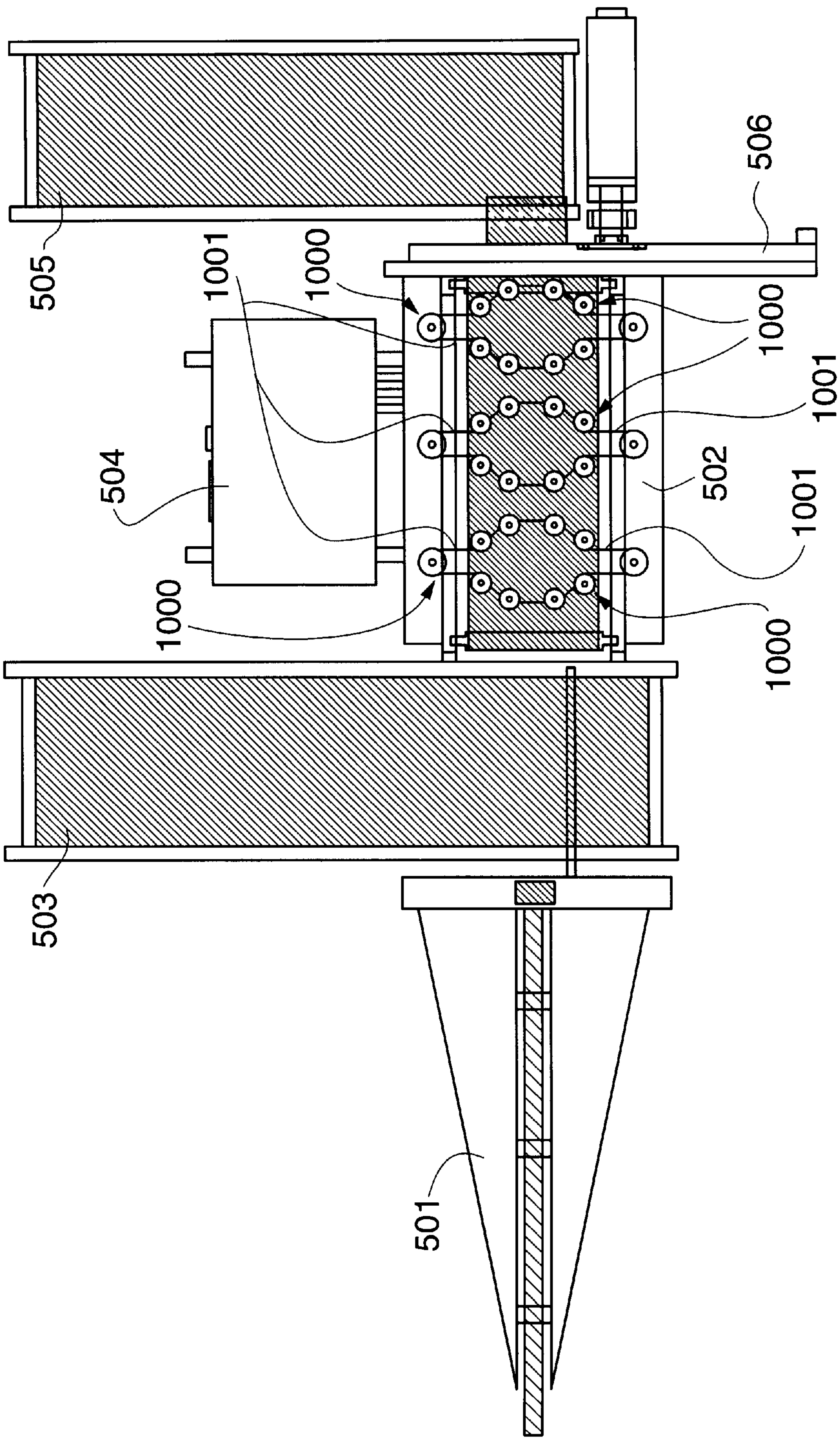
Figures 7A, 7B, 7C:
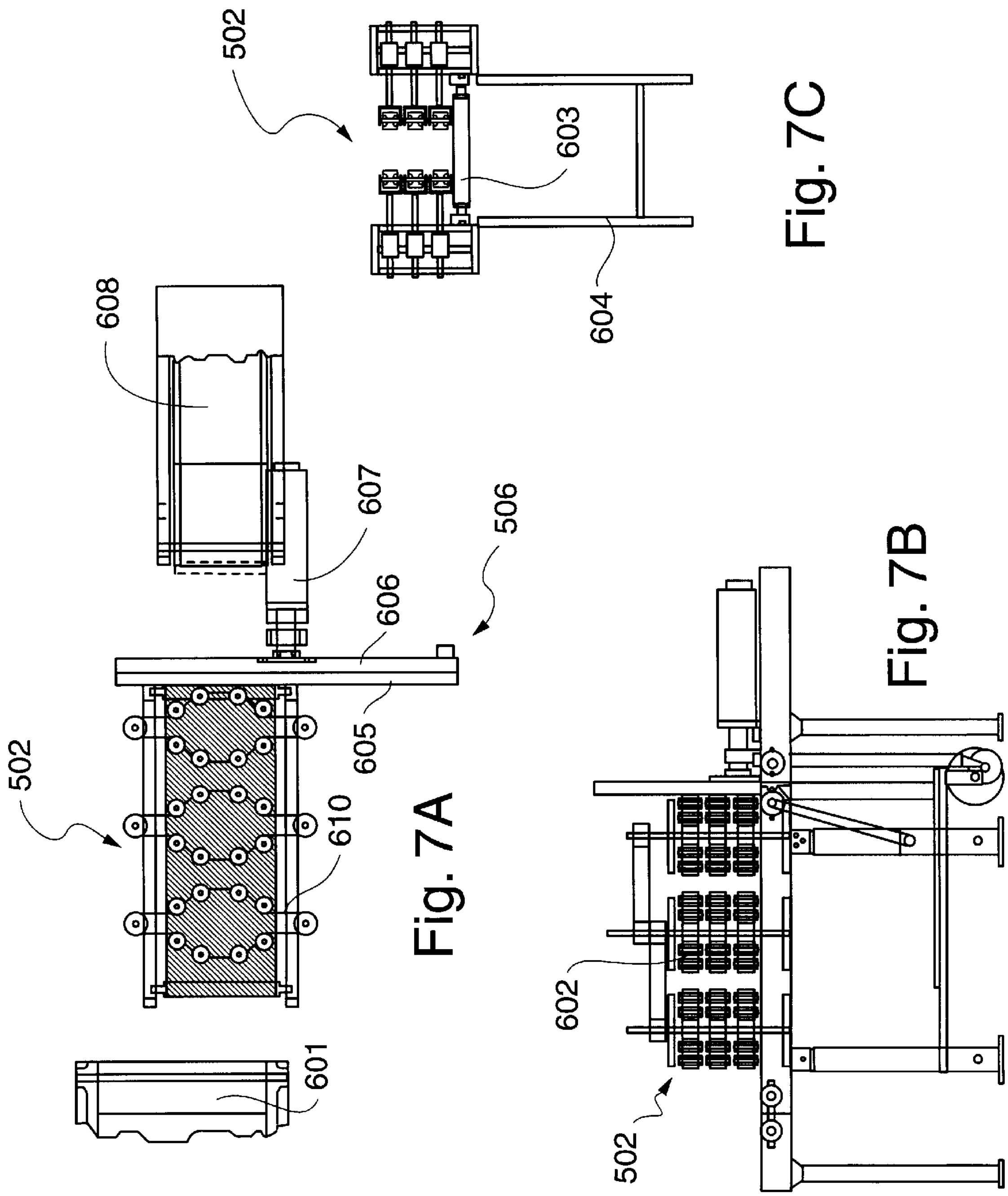
FIGS. 7A, 7B and 7C show the top, front and side views, respectively, of the loin holding mechanism 502 and the slicer blade/guard 506. In particular, the labels 601–608 refer respectively to a top view of the stainless steel loin conveying belt 601, the spring-loaded loin holding mechanism 602, front view of the loin conveying belt 603, apparatus framework 604, inside blade guard assembly 605, outer blade guard assembly 606, servo motor 607, and sliced product discharge conveyer 608.
Figure 8B:
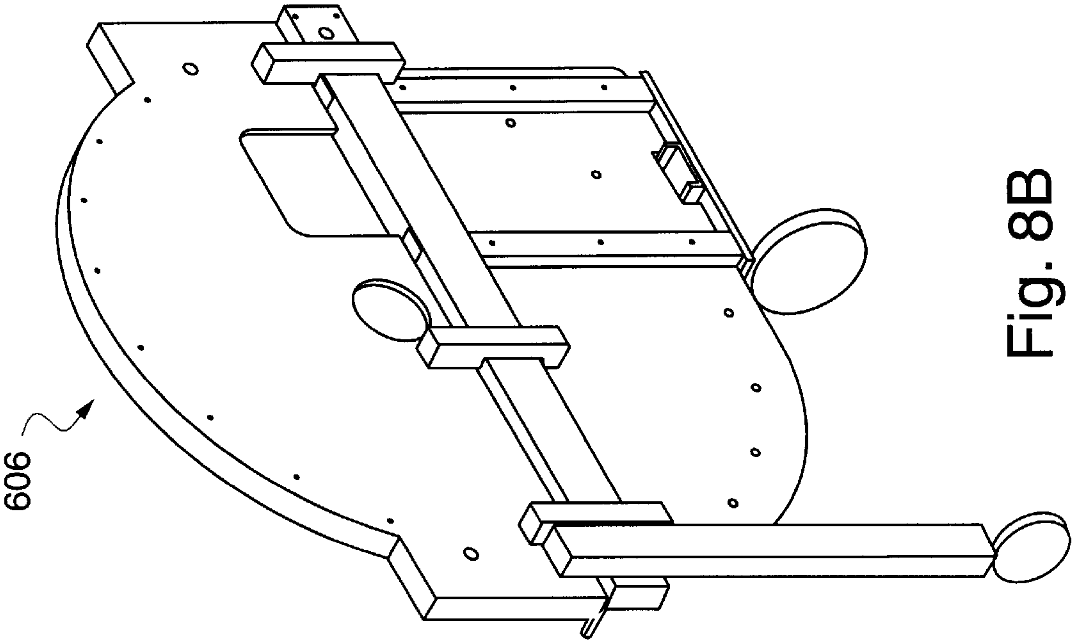
FIGS. 8A and 8B show the front and back of 605 and 606, respectively, of the blade guard assembly.
Figure 8A:
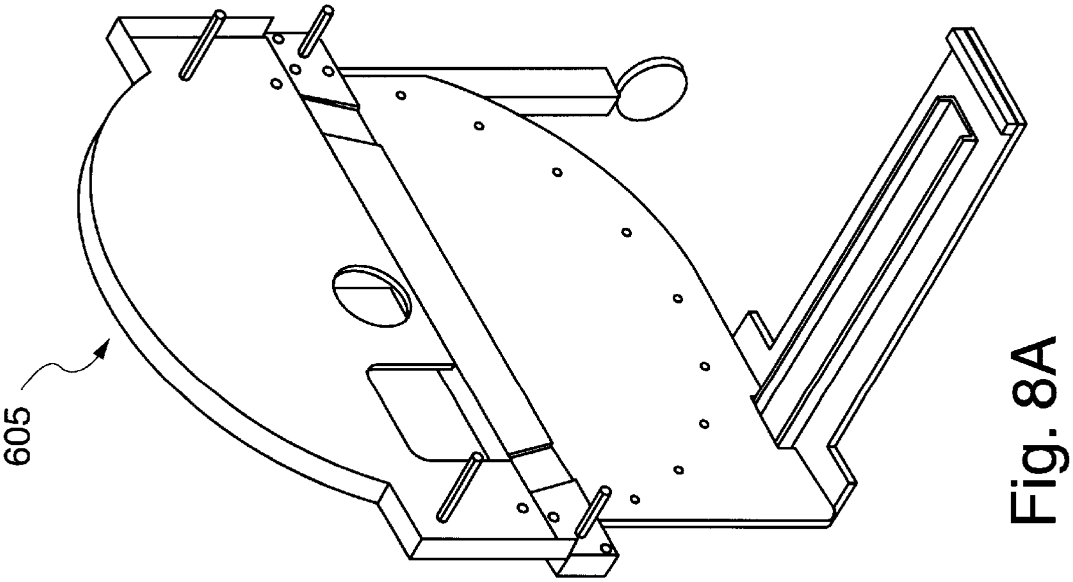
Figure 9A:
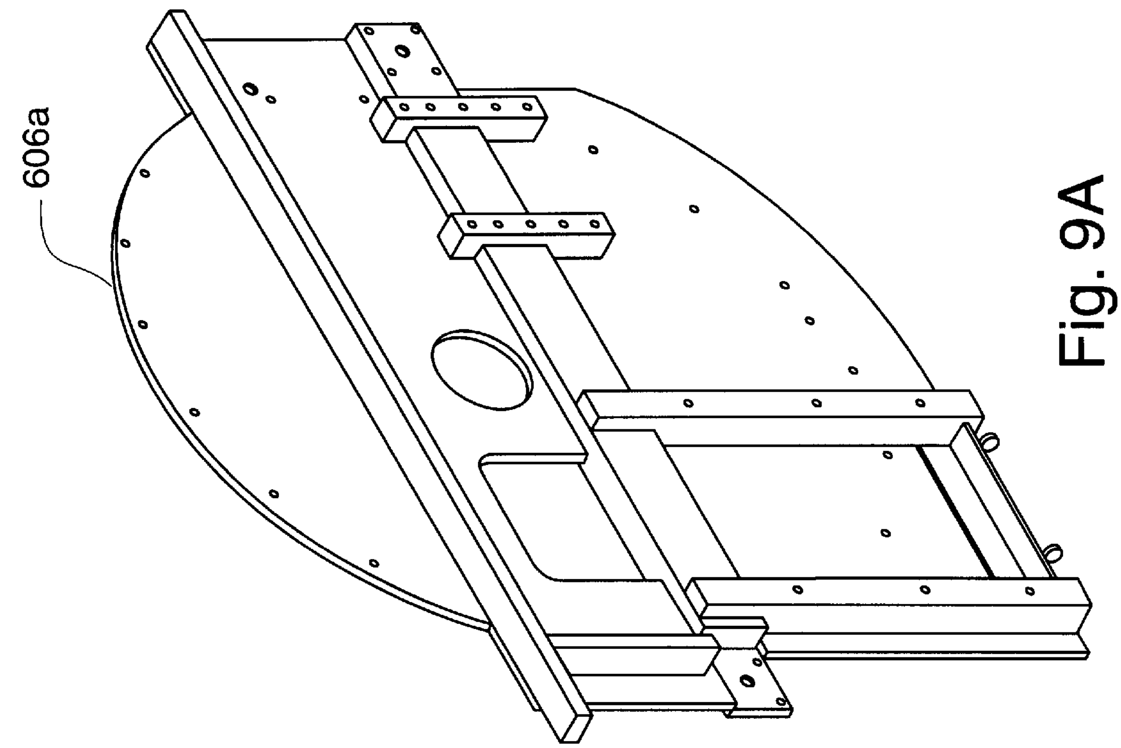
FIGS. 9A and 9B show the front and back of an inner blade guard assembly, respectively, wherein the inner blade guard assembly resides within the outer blade guard assembly having the front and back components as illustrated in FIGS. 8A and 8B.
Figure 9B:
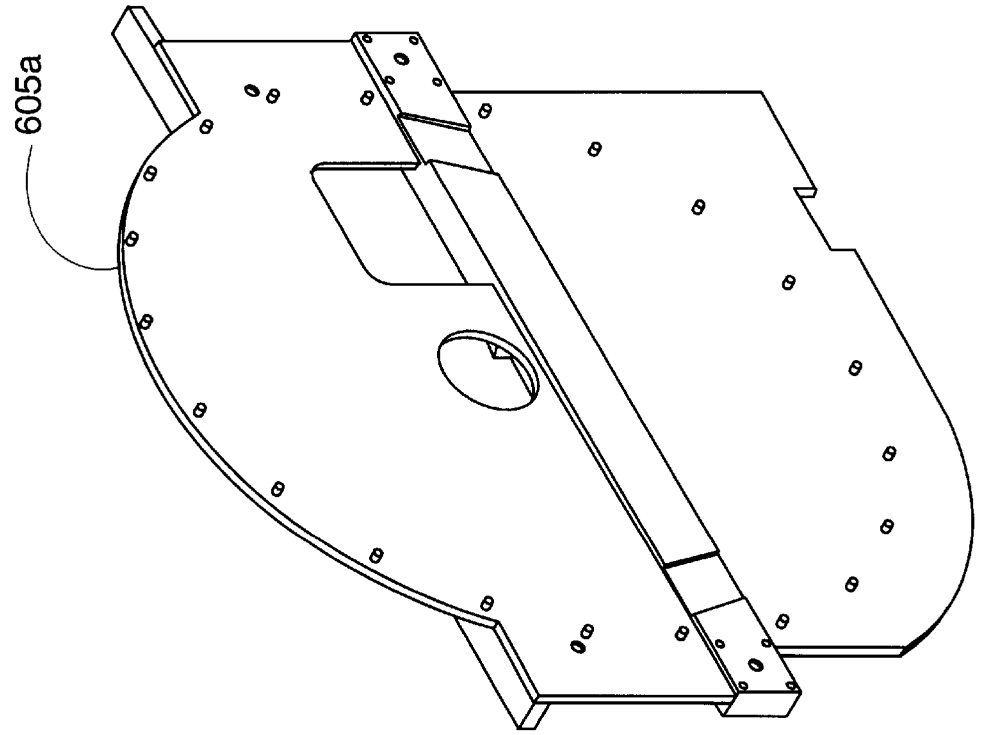
Figure 10C:
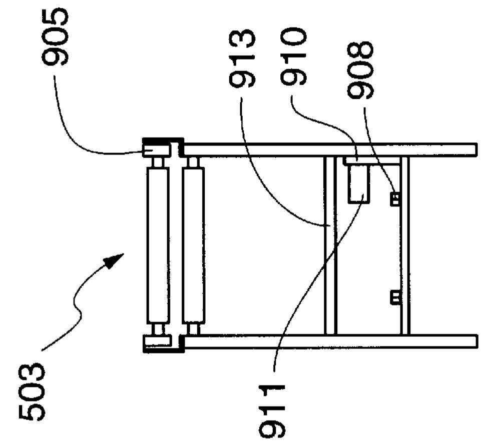
FIGS. 10A, 10B and 10C show the top, front and side views of the loin in-feed conveyor 503, respectively.
Figure 10A:
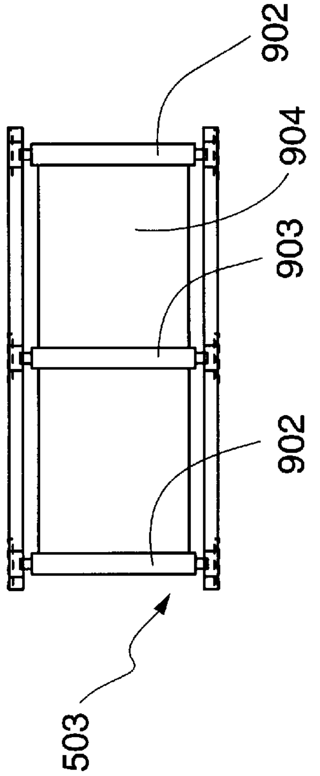
Figure 10B:
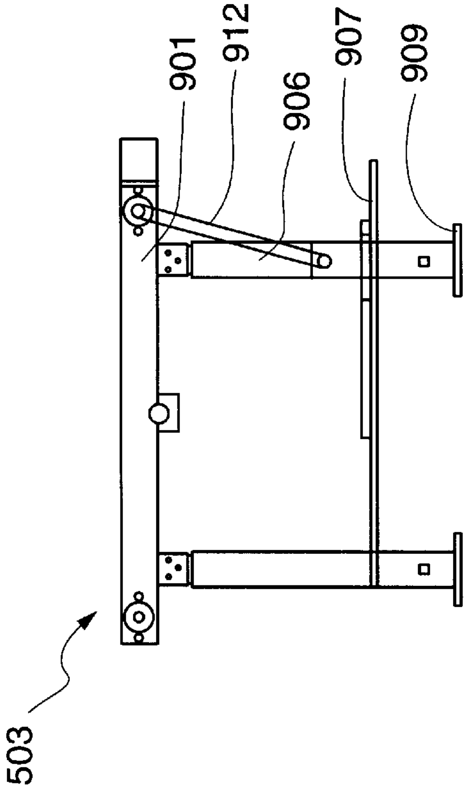
Figure 11C:
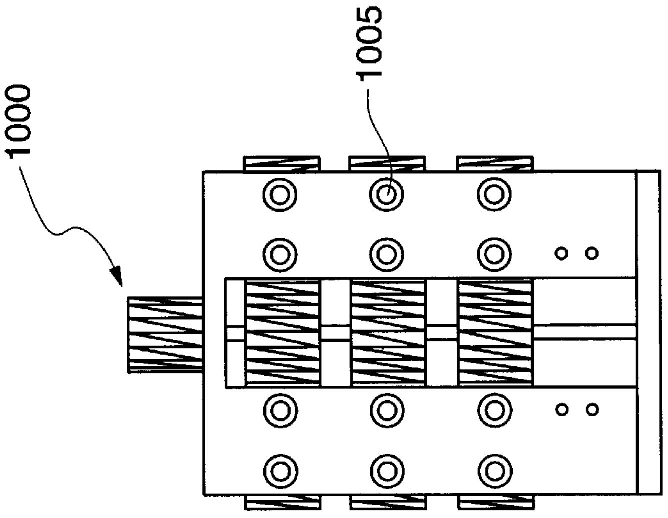
FIGS. 11A, 11B and 11C show the front, top and back views, respectively, of the tensioning sprockets 1000, these also being shown in spring-loaded loin holding mechanism in FIG. 6 as the tensioning sprockets and belts for loin holding mechanism 502.
Figure 11A:
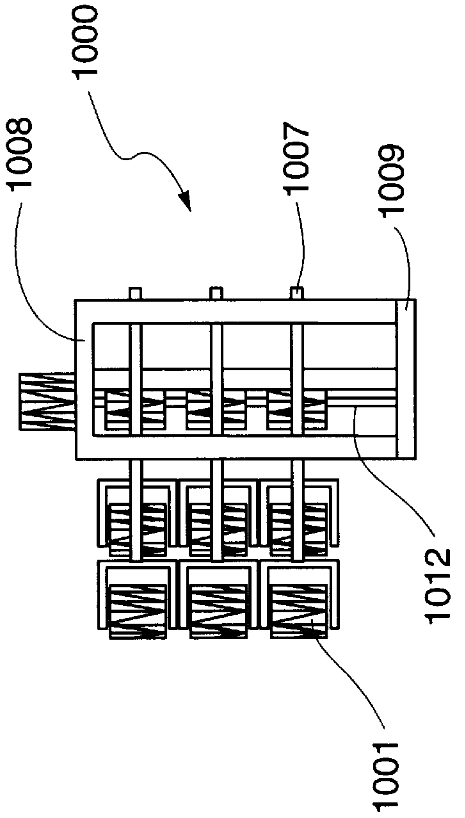
Figure 11B:
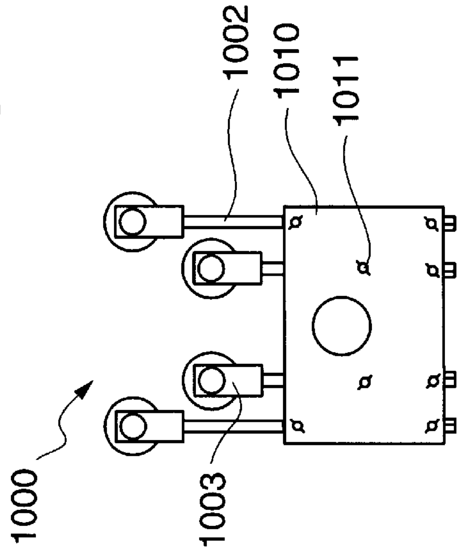
Figure 12:
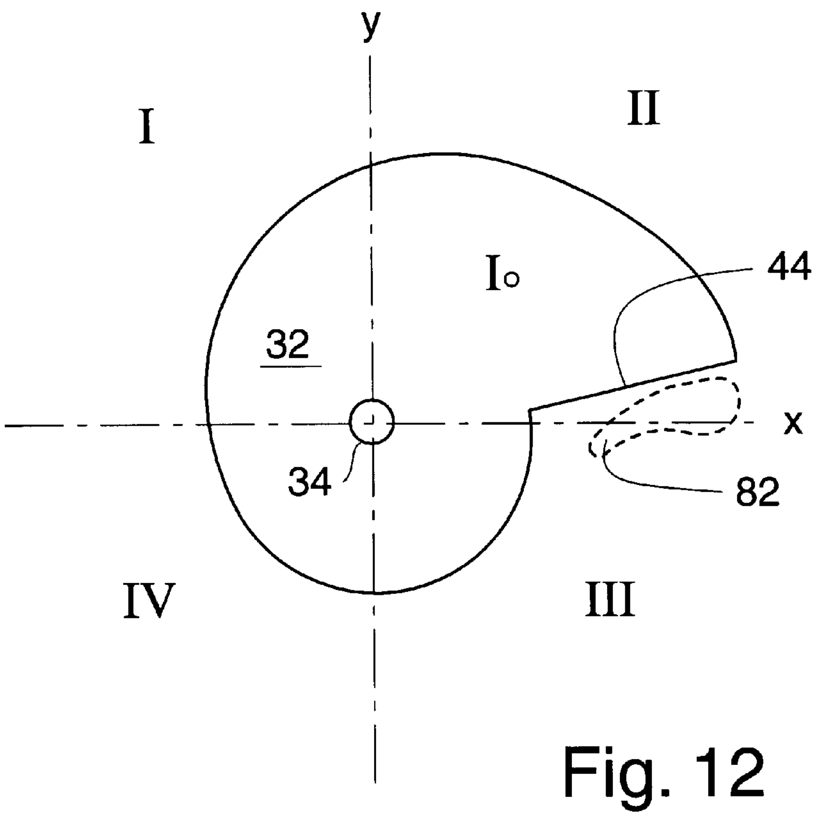
FIG. 12 shows the blade 32 in relation to a loin 82 and normal reference axes x and y.

Referring to FIG. 12, wherein the moment of inertia (Io) is offset from the center of mass, as the blade 32 rotates its cutting edge 44 toward the loin 82 (dashed in the present figure), the force of impact ($f_I$) on the loin 82 is equal to the force of acceleration due to gravity ($f_G$), plus the force of inertia ($f_M$) from the motor 48 (shown in FIG. 3A). Note that in one embodiment, the motor 48 is a servo motor, wherein the amperage to this motor can be varied. In particular, the amperage to the motor 48 may be increased as needed once the loin 82 has been sliced so that the cutting edge 44 rotates about the shaft 34 until the cutting edge is in quadrant I, and more preferably, at least at an angle of 45° within this quadrant. Thus, the rotation of the cutting edge 44 (at least through quadrants III, IV, and the initial portion of I) is at least partially due to a "flywheel" effect from the offset moment of inertia (Io). This is beneficial in that the torque on the motor 48 can be reduced during the upswing of the cutting edge 44 through quadrants IV and I. Further, the motor 48 can compensate for any additional inertia necessary on the upswing so long as: (load inertia)/(motor inertia) is in the range of 1.1 to 2.4, and more preferably in the range of 1.6 to 2.1. Note that if (load inertia)/(motor inertia) is greater than 2.4 (and, in many cases, greater than 2.1), the torque can quickly damage the motor 48. Relatedly, note that since the center of mass of the blade 32 is offset from the center of gravity, the motor inertia is increased by the square of this offset. This important in determining where to locate the center of mass and remain within acceptable force torque limits for the motor 48. Further note that the motor 48 may be an continuous duty servo motor having an operatively connected gear box (not shown) for assisting in reducing the torque applied to the motor 48.

Additionally, in some embodiments, a dynamic brake (not shown) may be included for braking the blade 32 rotation if the blade begins to rotate too fast. Thus, by varying the amperage of the motor 48 and braking as needed, a relatively constant number of revolutions per minute of the blade 32 can be obtained as determined through an encoder (not shown) on the shaft 34. Accordingly, a wide range in motors can be used so long as the rotational velocity of the shaft 34 can be measured and there is an effective capability for appropriately regulating the rotational velocity of the blade 32 via accelerating it and/or deacclerating it.

The second moment of inertia (Io), as one skilled in the art will understand, can be calculated using the parallel axis theorem based on the integration over the area of the surface 42*a* of the blade 32. The second moment of inertia of the blade 32 of the present embodiment is offset from the center of mass such that for "p", a point on the perimeter of the blade 32 that is furthest away from the center of mass of the blade, the second moment of inertia is 20% to 80% farther away from p. In other words, if the center of mass of the blade 32 is 8 inches from p, then the second movement of inertia will be 9.6 to 14.4 inches from p. Note that a more preferred additional percentage is 25% to 40% from the center of mass instead of 20% to 80%. Also note that the mass of the blade and size of the servomotor required to drive the blade are inversely related to one another for providing a given force of impact on the loin 82. For example, if a 10 pound blade is used, a 1 horsepower direct drive servo motor may be all that is required. However, if a 5 pound blade is used, the corresponding horsepower for generating the same force of impact may be three horsepower. To provide an effective slicing impact force for slicing a bone-in loin 82, the range of masses for the blade may be 1 to 15 pounds with corresponding horsepower ranges being 10 to 0.5 horsepower. In one preferred embodiment, the weight of the blade 32 is 3 to 7 pounds with motor 48 having a horsepower rating of approximately 3 to 0.5.

As the blade 32 rotates, the servo motor 48 accelerates the angular rate of change about the blade's axis of rotation during the blade's downward slicing swing (due to, e.g., gravity assistance), and the blade deaccelerates on the upward swing (due to gravitational effects on the center of mass being offset from the rotational axis of the blade). Moreover, at least the acceleration of the slicing swing may be enhanced by variation of coil amperage to the motor 48 and/or increasing percentage of offset between the moment of inertia and the center of mass as discussed hereinabove.

The force of impact of the blade 32 on the loin 82 is highly variable based upon loin temperature, composition and mass, as well as blade mass and the acceleration curve of the blade. For pork loins 82, it is necessary to overcome an average bone compression strength of 105,000 lb./in. If a blade 32 of 3 to 7 pounds rotates at an average rate of 200 revolutions per minute, then such a blade can be expected to deliver between 450,000 and 900,000 lb./in. force of impact. Further note that the orientation of the blade 32 relative to the loin 82 is such that the cutting edge 44 contacts the large loin bone in a manner to transmit the impact force substantially in a direction that the loin 82 has a substantial resistance to impact (e.g., a high point of the bone). Thus, the force of impact on the loin 82 can be considered to be purely a compressive force. However, if the blade 32 is used to slice other products besides loin 82, then the blade impact force may be considered as a combination of compressive and shear forces.

Note that a key feature for successful slicing of the loin 82 is the effectiveness of dampening the vibration applied to the blade 32. To effectively dampen such vibrations, the blade 32 has solid surfaces 42*a* and 42*b* for dampening blade vibration. That is, it is believed that blade 32 vibrations can be effectively dampened by having a relatively large percentage of blade surface area surrounding the shaft 34, and having this surface area contacted by vibration dampening stabilizers such as shim disks 52. More precisely, if a circle is drawn around the shaft 34, using the shaft as a center point, wherein the circle has a radius equal to the distance between this center point and the center of mass of the blade 32, then it is believed that 40% or more of the circular area must be coincident with a solid surface of the blade. Accordingly, this provides enough surface area to effectively dampen the blade 32 when using a self lubricating material such as UHMW or Delron plastic or other materials tightly pressed against the blade surfaces 42*a* and 42*b*. Note that in some embodiments, a dampening material is also required at or near the blade tip to inhibit vibration. For example, to control extremely tight cutting tolerances on products such as wood, plastic, or high value meats, the blade tip is the furthest part away from the base of the shaft 34 and subject to the greatest deviations due to vibration which must be dampened.

One embodiment of the blade 32 of the present invention is provided from a tungsten/steel alloy of approximately: 2–3% tungsten, 0.75–1.5% chromium, 0.1 5–1.5% carbon, 0.1–0.35% silica, and the remainder being a high speed steel mixture as one skilled in the art will understand. The tungsten steel alloy of the blade 32 has a compressive strength of approximately 450,000–900,000 pounds per square inch with a rupture strength of approximately 100, 000 pounds per square inch. Thus, the compressive strength of the blade is approximately seven times greater than its rupture strength, and the compressive strength is approximately seven times that of the bones within pork loins 82. Moreover, due to the high strength characteristics of the tungsten steel alloy, the thickness 270 (FIG. 3B) of the blade 32 substantially at the cutting edge 44 (e.g., within a range of 2 to 10 inches of the cutting edge 44) may be reduced from the standard blade thickness range of 0.25–0.375 inches typically used for high speed bone-in slicing to a thickness of 0.15–0.20 inches. This reduction in thickness is important in that it may reduce the amount of lower quality loin slices produced. That is, the thinner blade 32 may reduce bone fracturing, bone chipping, uneven cut, and/or excessive bone dust on loin slices provided with thicker blades having lower strength characteristics and therefore requiring thicker and likely blunter blades.

In another embodiment of the blade 32, zirconium can be impregnated into and/or coated onto the blade 32 through a process know as low temperature arc vapor deposition, as one skilled in the art will understand. That is, by inducing an arc around the y-axis (i.e., the central axis extending perpendicular to the diameter) of a zirconium cylinder, a cathodic reaction of the zirconium molecules occurs. The blade 32 (having a steel and/or steel-tungsten alloy composition) is placed in a vacuum at 3–5 torr near the zirconium cylinder thereby allowing the molecules of the blade to fuse with the zirconium molecules deposited on the blade during the vapor deposition process. Accordingly, the new alloy created on the surfaces 42*a,* 42*b* of the blade 32 has a hardness of 70–90 on the Rockwell 'c' scale, thereby increasing the blade strength and wear characteristics 5 to times that of a typical blade for slicing a bone-in loin 82. Again, the thickness of the blade 32 near the cutting edge 44 can be reduced to within the range of 0.15 to 0.20 inches.

Figure 13:
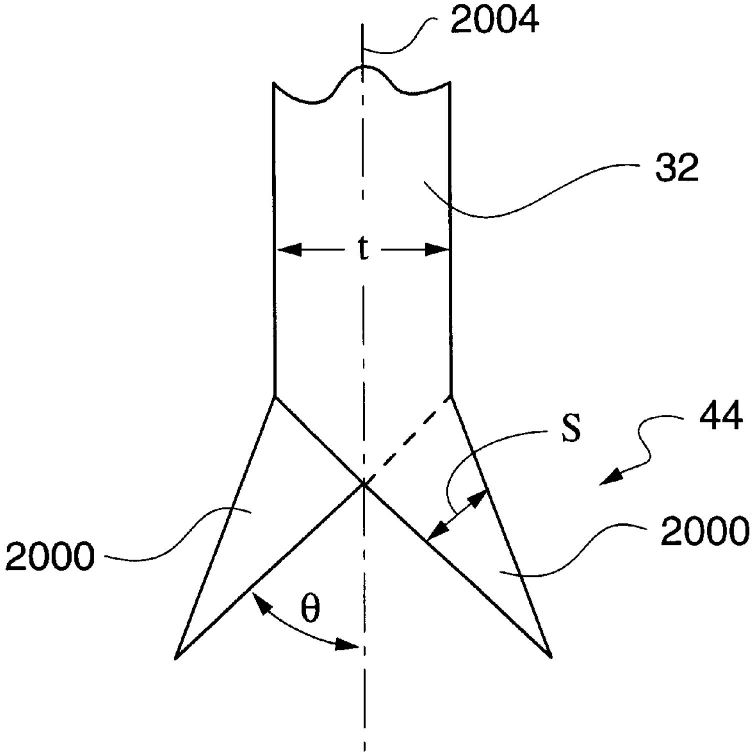
FIG. 13 shows a magnified view of the cutting edge 44 of the blade 32.

Referring to FIG. 13, a portion of the cutting edge 44 is shown substantially enlarged from that of the previous figures. Note that the edge 44 of the blade 32 has a configuration so that it functions substantially as a meat cleaver upon entering the loin 82 and subsequently also functions as a serrated knife when slicing through the non-bone portions of the loin 82. In particular, this dual functionality of the edge 44 is provided by the offset center of mass and the acceleration curve of the blade and servo motor respectfully in conjunction with the fine serrated edges machined out in the blade edge as shown in FIG. 13. The serrations 2000 are bent an angle of θ from the axis line 2004. This angle being in the range of 5° to 30°. The present cutting edge 44 design increases blade edge strength during impact and increases blade life. Note that more preferably θ is 10° to 20°. Further note that "t" is approximately 0.167 inches and "S" varies between 0.1 and 0.06 inches.

Note that the present invention may also be used with a conveyor for feeding loins 82 to the blade 32. However, in all such embodiments at least four to five sides of the portion of the loin adjacent to the cutting window (i.e., the top, bottom, and both sides of the loin and the distal end from the blade 32) are firmly held in place during the slicing operation so that the loin 82 is secured in a preferred position during the operation. In particular, the loin 82 is held in position during slicing by the following components: the bottom surface 78 and the sidewalls 76 of the slot 74 as well as by the loin hold-down cover 94, and the loin press 200 and the loin indexing plate 174. Thus, for cross-sections of the loin 82 adjacent the blade 32, the loin securing components contact the loin 82 about the surface of the cross-section for inhibiting the movement of the loin from a preferred position. More precisely, for each angle of approximately 90° having a vertex at a center of the planar cross-section (i.e., parallel to the slicing plane) of the large bone within a pork loin 82, the angle also being in the cross-sectional plane, the loin slicer provides resistance to movement of the loin 82 in directions subtended by the angle wherein the force for movement is generally outwardly directed from the large loin bone. Further this resistance is effective against the high impact forces (e.g. up to 105,000 lbs/in$^2$) generated when the blade 32 contacts the large loin bone. Additionally, note that in operation, there is a loin chop receiving apparatus attached adjacent the cutting window 98 to receive the sliced portions of the loin 82. Such a loin chop receiving apparatus may provide for stacking the newly sliced loin chops and/or providing each such loin chop to a conveyor for subsequent weighing and packaging thereof.

The following is a brief description of an alternative embodiment of the present invention whose components are shown in FIGS. 6–11B.

The operating procedure for activating this second embodiment of the loin slicer is embodied in the following steps:

1. Ensure that all emergency buttons are not depressed.
2. Turn on the loin slicing system.
3. If the E Button (i.e., emergency button) is engaged, the loin slicing system will indicates that the ‘E-Button is depressed.’
4. The status of all sensors for detecting whether operational status and safety of the loin slicing system must be verified.
5. Two main sensors are utilized, one of these sensors is to allow the loin slicing system to sense the presence of a loin 82 before activating the pusher (e.g., a loin indexing plate 174).
6. Wait until an operator screen of an operator or control panel displays messages indicating that activation can proceed.
7. The message panel will eventually display ‘Machine is Resetting Blade and Pusher’ thereby indicating that the loin slicing system is nearing a “ready” status.
8. Ensure that all conveyors are ON.
9. Note that an output conveyor for receiving the resulting loins slices must be on while the loin slicing system is in operation. The input conveyor for providing the loins 82 for slicing will be energized automatically.
10. The loin slicing system will reset the location of the blade 32 and the pusher. The blade edge 44 must be in quadrant I (FIG. 12) and be angled 30°–40° from the x axis for start-up.
11. Load all loins 82 onto the input conveyor.
12. If possible allow the loins to be placed parallel to the conveyor motion.
13. If the loin slicing system may be equipped with multiple blades 32, select the number of blades desired for use in loin slicing.
14. Instructions will dictate that an operator must select the blade rotation rate (RPM), the width of loin slices desired (in inches), and the Delay between each slice (in seconds). It is advisable to use a time delay between 0.1 to 0.5 seconds since this will prolong the life of the blade and may provide a more accurate loin slice width.
15. The loin slicing system is developed to allow the last one to two inches of the loin to be pushed out of the system without being sliced so that these pieces can be processed separately for further processing.

Trouble-shooting Procedure

The loin slicing system is not responding to any command:

Emergency stop has been activated.

Search for the correlated emergency and depress the red button.

If the output conveyor is not connected properly the system will consider this condition as an emergency.

If the blade 32 is out of synchrony:

Check the inductive sensor located at the main blade spindle.

Ensure that the sensor has not been removed, dislocated, or disconnected.

Place securely the sensor in the designated location.

You must pay attention to the SINGLE blade operation.

Locate the inductive sensor where location is designated for a single blade operation.

You must pay attention to DOUBLE blade operation. Locate the inductive sensor where location is designated for double blade operation.

Pusher does not return:

Ensure that all the limit switches are located in the designated location.

It is advisable to reset the loin slicing system by switching the power off for few seconds then switch the power on again.

If the blade 32 does not move:

The blade motor might have malfunctioned.

Switch off the system and switch on again.

The Loin 82 is skewed during feeding to blade:

Ensure that the sprockets, the timing belts, and idlers are engaged properly.

However, it is likely that the sprockets and their respective spindles are not tight enough.

Ensure that the holding collets and the set screws are tightened adequately along the sprocket shafts.

The Loin 82 is over fed prior to slicing:

Ensure that the proximity sensor is located properly at the correct designation.

Ensure also that the sensitivity of the sensor is adequate.

Ensure that the beam sensing range between the face of the loin and the sensor is adequate.

The status of the sensor will change only when the correct location of the loin 82 is reached.

You may change the sensitivity by turning the gain on the sensor to either direction using a screw driver. You may also change the sensing range of the sensor by turning the range button using a screw driver.

Loin is under fed:

Unless the loin is under fed to a distance greater than 1 inch, no necessary action is required.

If the loin is under fed by a distance greater than 1 inch you may apply the same procedure as described above.

Whole Loin conveyor is not responding:

Check the sensor located beyond the stainless steel guard at the end travel of the input conveyor.

Adjust the sensitivity and the range as described above. Ensure that the sensor is not disconnected.

Width is not consistent:

Increase the time delay between each slice.

Choose time delay between 0.1–10 seconds.

The following is a list of components for the second embodiment of the loin slicer.

| | | | |
|---|---|---|---|
| | MOTORIZED CONVEYERS: | | |
| 1 | CONVEYOR MOTOR | 1 PC | VARIABLE SPEED MOTOR, Wash-down Motor, Killmorgan/IDC/Galil Control, USDA Approved |
| 2 | CONVEYOR MOTOR | 1 PC | SERVO MOTOR, Wash Down, Galil Control, Killmorgan USDA Approved |
| 3 | CONVEYOR MOTOR | 1 PC | VARIABLE SPEED MOTOR, Galil Control, Killmorgan, USDA Approved |
| | TIMING BELTS: | | |
| 4 | TIMING BELT | 4 PCS | 420H200 SINGLE SIDED 1/2" PITCH 2" WIDE 42" LONG-Wash Down, JASEN UHMW/USDA |
| 5 | TIMING BELT | 18 PC | D390H200 DUAL-SIDE 1/2" PITCH 2" WIDE 39" Long Wash-Down, UHMW/USDA |
| | TIMING SHAFTS: | | |
| 6 | SHAFT, TIMING BELT PULLIES | 21 PC | SS, SHAFT FOR PULLIES IN CONTACT WITH MEAT SS. TENSIONERS & DRIVING PULLIES 36"/EA. |
| 7 | SHAFT, DRIVING PULLIES | 5 PCS | SS SHAFT CONNECTS TO SERVO MOTOR McM6112K19, P 1466 16 mm 2000 mm LONG/EA |
| | BEARINGS: | | |
| 8 | LINEAR BALL BEARING | 144 PC | SS 5/8" DIA ID, McM6262K14, P 1467 |
| 9 | LINEAR BALL BEARING RETAINER RINGS | 290 PC | BERGER, SS 1 1/8" SHAFT Q2-112 p. 476 50 pc/PKG |
| 10 | BLADE RESTRICTION R PLATE SHAFT | 3 PCS | SS 3/8" Dia. 36" L BERGER S1-74 |
| 11 | LINEAR BALL BEARINGS | 28 PC | McM Stainles Steel 3/8" Diam. 626K12 McM Stainless Steel 3/8" Dia. 6262K12 P. 1467 |
| 12 | BALL BEARINGS | 156 PC | Stainiess Steel 5 mm ID. 42 MM OD, 13 mm Thickness SS. Steel 15 mm ID, 42 mm OD, 13 mm THK |
| | BLADE: | | |
| 13 | BLADE | 1 PC | 62-65RC Hardened Stainless Steel, 0.160"× 36"× 12" |
| 14 | HOLE GROMMETS | 100 PC | McM 9600K36- Rubber, 100 Pcs/Pkg McM 9600K36 Rubber P. 2653 100 PCS/PKG |
| 15 | LARGE DIA. TFE TUBE | 3 PCS | McM 8556K57 5" OD × 4" ID × 6" L P. 2591 |
| | PILLOW-BLOCKS: | | |
| 16 | PILLOW BLOCK, | 2 PCS | McM 57685K17, P. 1455 For 1 1/2" Dia. Shaft |
| 17 | TEF PLATE | 6 PCS | McM 8545K157 3/8" × 12" × 36" |
| | | 2 PCS | McM 8545K47 3/8" × 24" × 24" |
| | | 1 PC | McM 8545K67 3/8" × 12" × 24" |
| 18 | 6/6 NYLON PLATE | 2 PC | McM 8539K57 3/8" × 24" × 48" |
| | | 1 PC | McM 8539K37 3/8" × 12" × 24" |
| | INFEED CONVEYOR LOIN ARRIVAL: | | |
| 19 | ADJUSTABLE CONVEYOR H-STAND | 2 PC | McM 5766K53 18" W 31"~37" H P. 407 |
| 20 | ADJUSTABLE CONVEYOR H-STAND | 2 PC | McM 5766K73 30" W 31"~37" H P. 407 |
| 21 | CONVEYOR BELT | 1 PC | McM 6116K161 PVC 14" Wide |
| 22 | CONVEYOR BELT LASING | 1 PC | McM 5999K95 14" Wide Stainless Steel P. 1437 |
| 23 | CONVEYOR BELT | 1 PC | McM 6116K166 PVC.156" THK 24" Wide. |
| 24 | CONVEYOR BELT | 1 PC | McM 5999K95 24" Wide Stainless Steel P. 1437 |
| 25 | STAINLESS STEEL SHAFT | 2 PC | McM 6112K22 25 mm Dia. 2000 mm L. P. 1466 |
| 26 | STAINLESS STEEL SHAFT | 1 PC | McM 6112K6 50 mm Dia. 2000 mm L. P. 1466 |
| 27 | FLANGED PILLOW | 12 PC | McM 58845K32 25 mm Shaft Stainless S. Steel P. 1457 |
| 28 | S. STEEL CHANNEL | 4 PCS | 4" × 1 9/16" × 3/16" 10 Ft. |
| | UPPER HOLD DOWN UNIT: | | |
| 29 | TOP PRESSURE ROLLER BRACKET | 1 PC | Stainless Steel, 10" × 24" × 3/32" |
| 30 | TOP PRESSURE YOKE | 3 PCS | Stainless Steel, 1/4" × 30" |
| 31 | TOP PRESSURE ROLLER SHAFT | 3 PCS | Stainless Steel 1/2" D × 97" L |
| 32 | TOP PRESSURE ROLLER | 3 PCS | UHMW, 10" D × 10" L |
| | SIDE SUPPORT: | | |
| 33 | SIDE RESTRICTOR PULLEY YOKE | 36 PCS | Stainless Steel, 4" D × 4" L |
| 34 | TENSIONER YOKE | 36 PCS | Stainless Steel, 4" D × 10" L |
| 35 | FRONT MOUNTNG BAR | 24 PCS | Stainless Steel, 2" × 24" L |
| 36 | CONNECTING BLOCK | 12 PCS | Stainless Steel, 12" × 36" |
| 37 | BEARING PLATE | 12 PCS | Stainiess Steel 48" × 24" |
| 38 | REAR SUPPORTING PLATE | 12 PCS | Stainless Steel, 48" × 24" |
| 39 | IDE RESTRICTOR & TENSIONER SHAFT | 72 PCS | Stainless Steel, 21/4" D × 32" |

-continued

| | | | |
|---|---|---|---|
| 40 | SIDE PRESSURE PLATE MOUNTING BAR | 4 PCS | Stainless Steel, 2" D × 36" |
| | CUTTING CONVEYOR: | | |
| 41 | CUTTING CONVEYOR SIDE CHANNEL | 2 PCS | Steel, 3 layers of enamel painting, One Hot, Two Cold Spray |
| 42 | CUTTING CONVEYOR LOWER LEG | 4 PCS | Steel, 3 layers of enamel painting, One Hot, Two Cold Spray |
| 43 | CUTTING CONVEYOR UPPER LEG | 4 PCS | Steel, 3 layers of enamel painting, One Hot, Two Cold Spray |
| 44 | SUPPORTING BRACKET | 4 PCS | Steel, 3 Layers of enamel painting, One Hot, Two Cold Spray |
| 45 | CONNECTING BAR | 4 PCS | Steel, 3 layers of enamel painting, One Hot, Two Cold Spray |
| | CONVEYOR BELT: | | |
| 46 | SUPPORTING BRACKET | 4 PCS | McM 6116K 166PVC 156" L 24" W<br>Steel, 3 layers of enamel painting, One Hot, Two Cold Spray |
| 47 | TIMING BELT PULLEY FOLLOWER & TENSIONER | 72 PCS | Stainless Steel, 4" D × 4" L |
| 48 | TIMING BELT PULLEY DRIVER | 12 PCS | STAINLESS STEEL, 4" D × 4"L |
| | SECURITY COVERS: | | |
| 49 | MACHINE WHOLE COVER | 2 PCS | STAINLESS STEEL, SIDES |
| 50 | CONVEYOR GUIDING RAIL NO. 3 CONVEYOR | 2 PCS | UHMW 1/8" × 10' × 4" McM 8730K43 FDA Apprd. |
| 51 | CONVEYOR GUIDING RAIL, NO. 1 CONVEYOR | 2 PCS | UHMW 1/8" × 10' × 6" McM 8730K54 FDA Apprd. |
| 52 | NO.3 CONVEYOR GUIDING RAIL BRACKET | 8 PCS | Stainless Steel 2" W × 6" L × 1/4" |
| 53 | NO.1 CONVEYOR GUIDING RAIL BRACKET | 6 PCS | Stainless Steel 2" W × 12" L × 1/4" |
| 54 | CONVEYOR BELT TENSIONER ASS'Y | 3 SETS | UHMW Roller, Steel Slide & Spring |
| | BLADE: | | |
| 55 | BLADE GUIDE | 1 SET | 7/8" THK. Stainless Steel, and UHMW, 2 Plates, 60" D |
| 56 | BLADE ROLLERS ASS'Y | 2 SETS | Stainless Steel Bracket, 11/8" Dia. Roller |
| 57 | BLADE GUARD | 1 PC | 1"–16 Stainless Steel Bar |
| 58 | NO. 2 CUTTING CONVEYOR BELTING PRONGS | | Stainless Steel, 401 SS 120" L × 48" W |
| 59 | BIG DIA. TEF TOP ROLLER & BRACKET ASS'Y | 3 SETS | Stainless Steel, 40155 & TFE |
| 60 | SPRINGS | | LEE Springs, SS 0.0125 Spring Coeficient, 3/32" D × 8" L |
| 61 | BLADE MOTOR STAND | 1 PC | S. Steel, L-Bracket, 10" × 10" × 10" |
| 62 | LARGE TIMING BELT PULLEY: | 26 PCS | Stainless Steel, 1/2" Pitch, 19 Grooves, 3.25" Dia. |
| 63 | SMALL TIMING BELT PULLEY: | 72 PCS | Stainless Steel, 1/2" Pitch, 16 Grooves. 2.50" Dia. |
| | BLADE MOTOR: | | |
| 68 | BLADE SERVO MOTOR | 1 PC | SERVO MOTOR, IDC, Killmorgen, USDA Wash-Down |
| 69 | CHOPPING BLOCK SUPPORTING LEGS (BACK) | 2 PCS | S. Steel, 32" × 4" Square |
| 70 | CHOPPING BLOCK SUPPORTING LEGS (FRONT) | 2 PCS | S. Steel, 32" × 4" Square |
| 71 | CHOPPING BLOCK (FRONT) | 1 PC | S. Steel, 2" × 2" × 8" |
| 72 | CHOPPING BLOCK (BACK) | 1 PC | S. Steel, 2" × 2" × 8" |
| 73 | SLIDING SHOULDER SCREW | 2 PCS | S. Steel, 7" L × 11/4" D |
| | PUSHER ASSEMBLY: | | |
| 74 | Pusher Assembly | 1 PC | 108" Indexing System, High Speed Bet Driven, 5 m/s IDC Indexing, IDC Driver, IDC Controller |
| 75 | Front UHMW Head | | 1 4" × 4", Stainless Steel Tubing |
| 76 | Limit Switch, Home position | | 1 IDC Sensor Magnetic, 5–30 VDC |
| 77 | Limit Switch, Max. Travel | | 1 IDC Sensor Magnetic, 5–30 VDC |
| 78 | Loin Arrival, Optical Sensor | | 1 Keyence, Opticai Sensor, 5–30 VDC |
| 79 | Loin Shieid | | 1 Stanless Steel, 401, 36" × 12" × 1/16" |
| 80 | Slice Chute | | 1 Stainless Steel 1/16" Thick |

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiment described hereinabove is further intended to explain the best mode presently known of practicing the invention and to enable others skilled in the art to utilize the invention as such, or in other embodiments, and with the various modifications required by their particular application or uses of the invention. It is intended that the appended claims be construed to include alternative embodiments to the extent permitted by the prior art.

What is claimed is:

1. A food product slicer, comprising:

a slot for receiving one or more pieces of a food product to be sliced, via an opening to an interior of said slot;

a blade having a slicing edge, wherein said slicing edge iterates between a first configuration wherein said slicing edge is in a position for slicing a first of said pieces of the food product, and a second configuration wherein said slicing edge is not in a position for slicing said first piece;

a means for iteratively securing and releasing said first piece, wherein when said slicing edge is in said first configuration there is a position securing force applied to said first piece adjacent where said cutting edge slices said first piece, and wherein when said slicing edge is in said second configuration, there is a reduction in said securing force so that said first piece is capable of being moved.

2. A food product slicer, as claimed in claim 1, wherein said slicer is effective for slicing bone-in pork loins.

3. A food product slicer, as claimed in claim 1, wherein said interior has a contour generally in a shape for restricting movement of a pork loin in substantially every direction except a movement toward said blade.

4. A food product slicer, as claimed in claim 1, wherein said slot and said means for iteratively securing and releasing are effective for securing said first piece in a preferred position during slicing by said blade.

5. A food product slicer, as claimed in claim 1, wherein said slot and said means for iteratively securing and releasing contact said first piece contact said first piece about its cross section adjacent said blade for thereby inhibiting a movement for said first piece during a slicing thereof.

6. A food product slicer, as claimed in claim 1, further including a cover for said slot opening, wherein said cover is capable of being retracted from said slot opening so that said one or more pieces of the food product can be provided in said interior.

7. A food product slicer, as claimed in claim 6, further including a means for biasing said cover in a position that facilitates retaining said pieces in said interior.

8. A food product slicer, as claimed in claim 7, wherein said means for biasing includes one or more assemblies operationally connected to said cover for at least one of securing said cover over said slot opening and retracting said cover from said slot opening.

9. A food product slicer, as claimed in claim 1, wherein said interior includes has a contour that facilitates retaining said pieces in a predetermined orientation relative to said blade.

10. A food product slicer, as claimed in claim 1, wherein said blade rotates about an axis, and wherein said slicing edge extends substantially radially outwardly from said axis.

11. A food product slicer as claimed in claim 1, wherein said means for iteratively securing and releasing includes a reciprocating press for iteratively pressing against said first piece and releasing from said first piece, wherein said pressing and said releasing are synchronized with a position of said slicing edge.

12. A food product slicer, as claimed in claim 11, wherein said reciprocating press is operatively connected to a cam follower, said cam follower following a cam path having a contour that induces said press to reciprocate.

13. A food product slicer, as claimed in claim 1, further including an indexing means for incrementally urging at least said first piece of the food product toward said blade.

14. A food product slicer, as claimed in claim 13, wherein said indexing means receives input from a controller for indicating a distance that said first piece is to be moved in the direction of said blade.

15. A food product slicer, as claimed in claim 1, further including a controller for detecting at least one of:

a position of said slicing edge, and a revolution rate of said blade.

16. A food product slicer as claimed in claim 1, wherein said blade is fused with zirconium.

17. A food product slicer as claimed in claim 1, wherein approximately 40% or more of a circle's area about a rotational axis for said blade coincides with a surface area of said blade, wherein the surface area is capable of being contacted by a blade vibration damping component, and wherein said circle has a radius extending from said rotational axis to approximately a center of mass of said blade.

18. A method for slicing a food product having a bone therein with a compressive strength in a range of approximately greater than 60,000 pounds per square inch, comprising:

providing a blade for slicing the food product and the bone;

urging the food product toward said blade so that a predetermined amount of the food product is presented to said blade for slicing;

restricting movement of the food product adjacent where slicing occurs;

wherein said step of restricting restricts movement of the food product in each angle about a center of the bone in a plane defined by a slicing of the bone by the blade, said angle being approximately 90°; and slicing the food product when the food product is restricted in its movement in response to an impact of said blade.

19. A method as claimed in claim 18, wherein the food product is a bone-in loin.

20. A method as claimed in claim 18, wherein said blade has an involute profile and a moment of inertia offset from a center of mass.

21. A method as claimed in claim 18, wherein said step of providing includes performing a vapor deposition for coating said blade with a material for strengthening said blade.

22. A method as claimed in claim 21, wherein said material includes zirconium.

23. A method as claimed in claim 18, wherein said step of urging includes activating a motor for urging the food product toward the blade, wherein said motor has activations synchronized with a periodicity of said blade slicing the food product.

24. A method as claimed in claim 18, wherein said step of restricting includes exerting a force against the food product, wherein said step of exerting is synchronized with a periodicity of said blade slicing the food product.

25. A method as claimed in claim 18, wherein said step of slicing includes rotating said blade during a slicing of the food product.

26. A method as claimed in claim 25, wherein said step of slicing includes accelerating said blade at a rate of angular change between slicings of the food product.

27. A method as claimed in claim 18, further including the steps of:

retracting a cover for a slot for receiving the food product; and closing said cover about the food product when the food product is deposited within said slot.

28. A method as claimed in claim 27, wherein said step of closing is performed using one of a pneumatic device, a hydraulic device, and an electrical device.

29. A method as claimed in claim 18, wherein said step of urging includes piercing said food product with one or more projections for restricting an undesirable movement of the food product.

* * * * *